(12) United States Patent
Chao

(10) Patent No.: US 9,657,773 B2
(45) Date of Patent: May 23, 2017

(54) LINEAR SLIDE RAIL AND GUIDE WHEEL SEAT ASSEMBLY THEREOF

(71) Applicant: OME TECHNOLOGY CO., LTD., New Taipei (TW)

(72) Inventor: Chun-Chin Chao, New Taipei (TW)

(73) Assignee: OME TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/877,249

(22) Filed: Oct. 7, 2015

(65) Prior Publication Data

US 2017/0037898 A1 Feb. 9, 2017

(30) Foreign Application Priority Data

Aug. 3, 2015 (TW) .............................. 104125099 A

(51) Int. Cl.
*F16C 29/12* (2006.01)
*F16C 29/04* (2006.01)

(52) U.S. Cl.
CPC ............ *F16C 29/12* (2013.01); *F16C 29/045* (2013.01)

(58) Field of Classification Search
CPC ...... F16C 29/00; F16C 29/001; F16C 29/045; F16C 29/12; F16C 13/006
See application file for complete search history.

(56) References Cited

U.S. PATENT DOCUMENTS

| 3,427,080 | A | * | 2/1969 | Folk | F16C 29/045 384/55 |
| 5,070,575 | A | * | 12/1991 | Redman | E05D 15/0634 16/105 |
| 5,735,214 | A | * | 4/1998 | Tsuboi | F16C 29/045 104/106 |
| 6,244,361 | B1 | * | 6/2001 | Comeau | E21B 7/062 175/24 |
| 6,564,722 | B1 | * | 5/2003 | Kurosawa | F16C 29/045 104/106 |
| 6,648,508 | B1 | * | 11/2003 | Brunk | F16C 29/008 384/48 |

(Continued)

FOREIGN PATENT DOCUMENTS

| DE | 202008013030 U1 | * | 3/2009 | ............. E01D 21/00 |
| SE | EP 2100715 A1 | * | 9/2009 | ......... B29C 45/1459 |
| WO | WO 2015112544 A1 | * | 7/2015 | ............. F16C 29/045 |

*Primary Examiner* — Alan B Waits
(74) *Attorney, Agent, or Firm* — Li & Cai Intellectual Property (USA) Office

(57) ABSTRACT

A linear slide rail includes a rail structure and a slider structure. The rail structure has an elongated strip shape and defines a longitudinal axis direction, wherein the rail structure has two guide grooves respectively disposed at two opposite sides of the rail structure. The slider structure has a cooperating groove which is slidably sleeved on the rail structure. The slider structure includes a carrier assembly and two guide wheel seat assemblies. The two guide wheel seat assemblies are respectively disposed at two opposite sides of the carrier assembly, and the two guide wheel seat assemblies are respectively disposed corresponding to the two guide grooves at the two opposite sides of the rail structure. Each of the guide wheel seat assemblies includes a seat unit, a plurality of guide wheel units, a plurality of shaft units, a first lever unit, and a first adjusting unit.

10 Claims, 11 Drawing Sheets

(56) References Cited

U.S. PATENT DOCUMENTS

| | | | | |
|---|---|---|---|---|
| 6,679,631 B2* | 1/2004 | Iida | ............... | F16C 29/045 |
| | | | | 384/55 |
| 7,752,978 B2* | 7/2010 | Schroeder | ............ | F16C 29/005 |
| | | | | 104/106 |
| 9,140,301 B1* | 9/2015 | Williams | ............... | F16C 29/12 |
| 2007/0251408 A1* | 11/2007 | Fletcher | ................ | B61B 13/02 |
| | | | | 104/247 |
| 2010/0206670 A1* | 8/2010 | Schroeder | ............... | B23Q 1/40 |
| | | | | 187/410 |

* cited by examiner

LINEAR SLIDE RAIL AND GUIDE WHEEL SEAT ASSEMBLY THEREOF

BACKGROUND OF THE INVENTION

1. Field of the Invention

The instant disclosure relates to a linear slide rail; in particular, to a pre-determined pressure adjustable linear slide rail and guide wheel seat assembly thereof.

2. Description of Related Art

Since a precision feeding systems are being continuously developed and improved, linear drive technology and its products have become the most important part in many precision machines, and various linear apparatuses have been widely incorporated into human life, processing plants, and high-tech equipment.

At present, a rail structure and a slider structure are most often cooperatively used in a linear slide rail, and the slider structure smoothly and speedily slides on the rail structure. However, this type of linear slide rail can only be utilized in certain products, due to the linear slide having a load weight that has a limited range, such that it narrows its application. Besides, when the linear slide rail is used for a predetermined time, it will degrade due to wear and tear and have to be changed.

A preload adjustable linear slide rail has been developed, and the preload is applied to enhance its stiffness. However, the preload of the linear slide rail needs to be adjusted before the slider structure is installed, or after the linear slide rail has been loosened and disassembled. Hence, it causes inconvenience to the user.

For such reasons as outlined above, to provide a linear slide rail that can directly adjust its preload from outside the machine to overcome the abovementioned drawbacks is one of the important issues in the industry.

SUMMARY OF THE INVENTION

In order to overcome the abovementioned problems, this instant disclosure provides a linear slide rail and a guide wheel seat assembly thereof. By adjusting the displacement of a plurality of guide wheels, the preload pressure of the linear slide rail can be further adjusted to increase the stiffness of the linear slide rail, and meanwhile a pendulum and an inertia impact generated by reciprocation can be decreased.

To achieve the abovementioned purpose, one of the embodiments of this instant disclosure provides a guide wheel seat assembly which includes a seat unit, a plurality of guide wheel units, a plurality of shaft units, a first lever unit, and a first adjusting unit. The seat unit includes a first sliding thru-hole and a plurality of guide wheel grooves. The plurality of guide wheel units are respectively disposed in the plurality of guide wheel grooves, and the plurality of shaft units are respectively pivoted to the plurality of guide wheel units, so that the plurality of guide wheel units are respectively rotated corresponding to the plurality of shaft units. The first lever unit is slidably disposed in the first sliding thru-hole, the first lever unit has a first propping surface, a first end portion, and a second end portion disposed correspondingly to the first end portion of the first lever unit, wherein the first propping surface of the first lever unit is abutted against the shaft unit. The first adjusting unit has a first abutting surface, the first end portion of the first lever unit is slidably abutted against the first abutting surface of the first adjusting unit, so that the first lever unit is reciprocally moved along a first direction, and each of the shaft units is abutted against the first propping surface of the first lever unit to reciprocally move along a second direction, wherein the first direction and the second direction have different directions. Another embodiment of the instant disclosure further provides a linear slide rail having the guide wheel seat assembly.

This instant disclosure has the benefit that, in the linear slide rail and guide wheel seat assembly of the embodiment of this instant disclosure, the displacement of the first lever unit is spurred by the movement of the first adjusting unit, such that the plurality of first abutting surfaces of the first lever unit are abuttedly pivoted to the plurality of shaft units of the plurality of guide wheel units respectively, so as to achieve the plurality of guide wheel units applying the preload on the guide groove of the rail structure at the same time to increase the stiffness of the linear slide rail, and the pendulum and the inertia impact generated by reciprocation can be decreased.

In order to further appreciate the characteristics and technical contents of the present invention, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1:
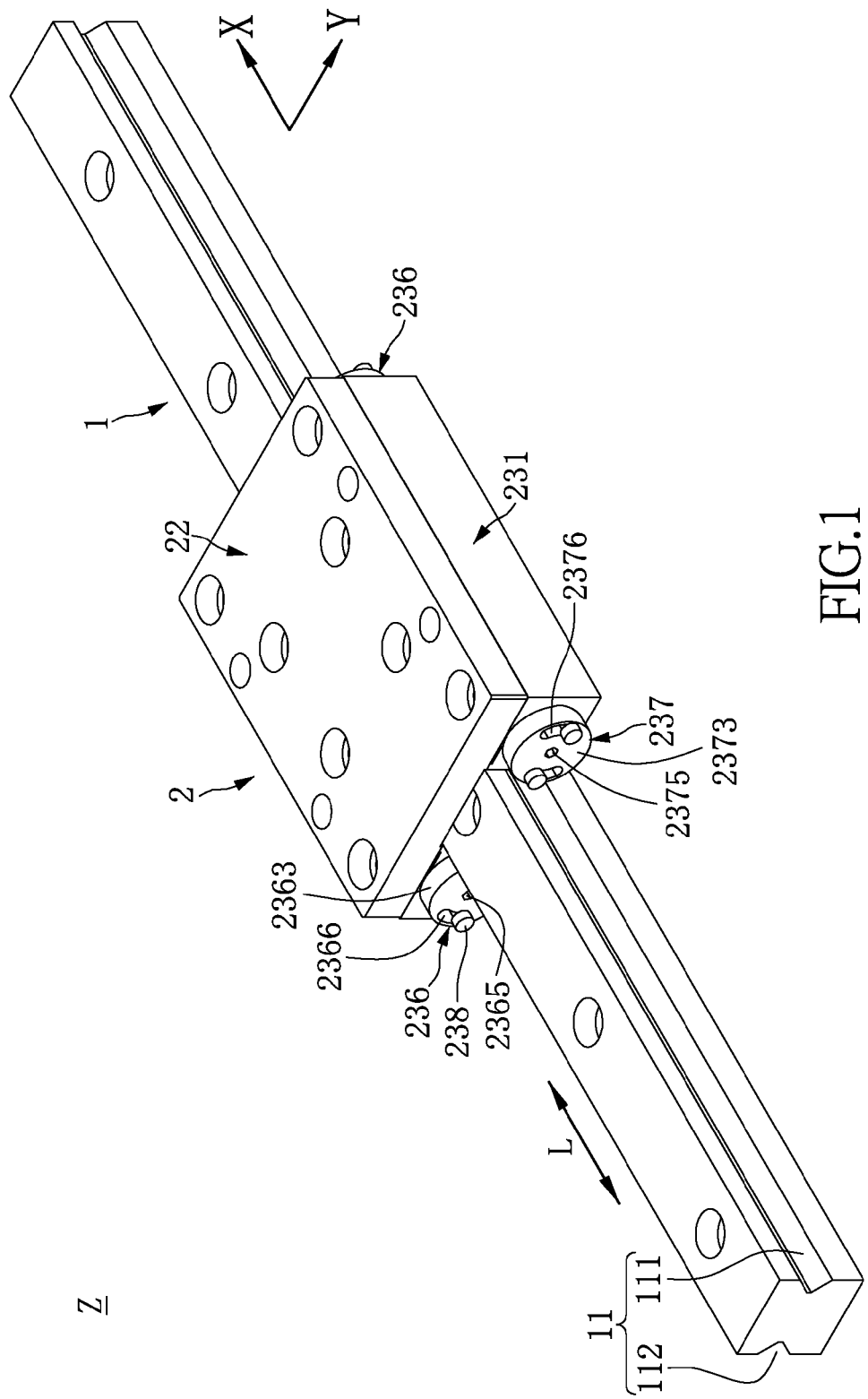
FIG. 1 shows a combination perspective schematic view of a linear slide rail of an embodiment in the instant disclosure.
Figure 2:
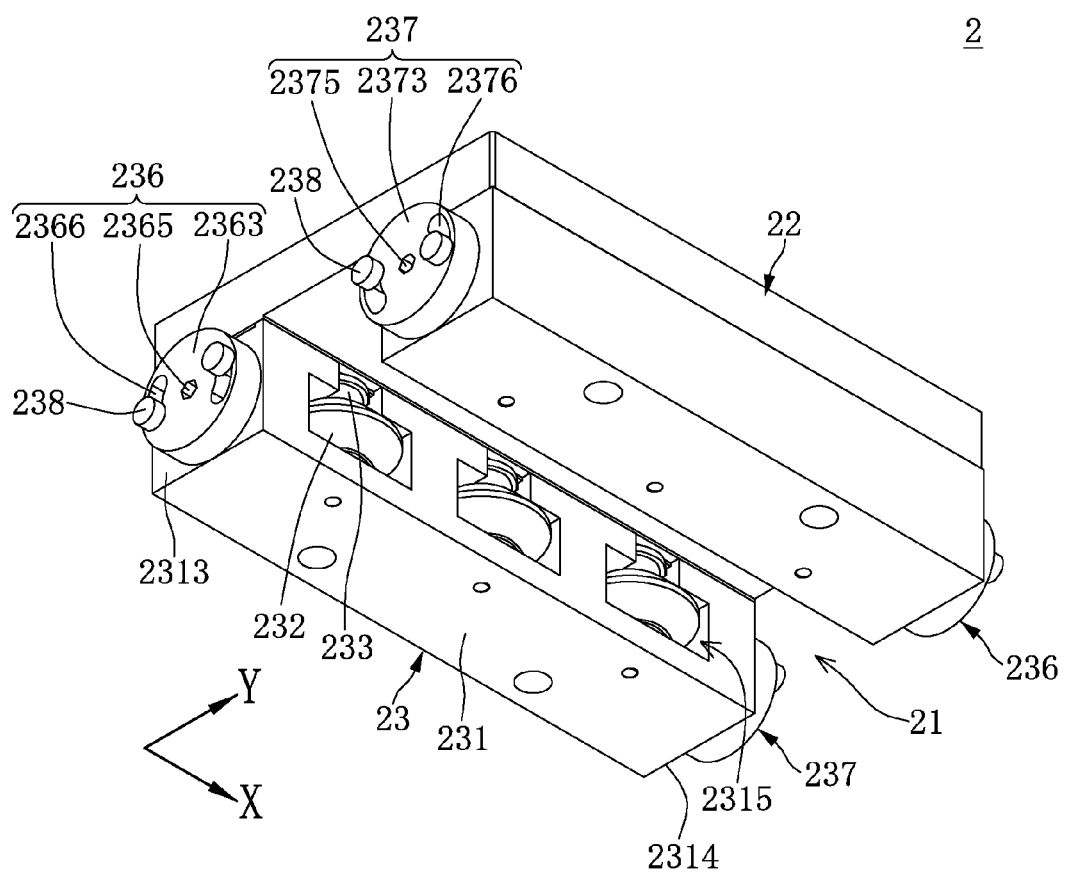
FIG. 2 shows a combination perspective schematic view of a slider structure of an embodiment in the instant disclosure.
Figure 3:
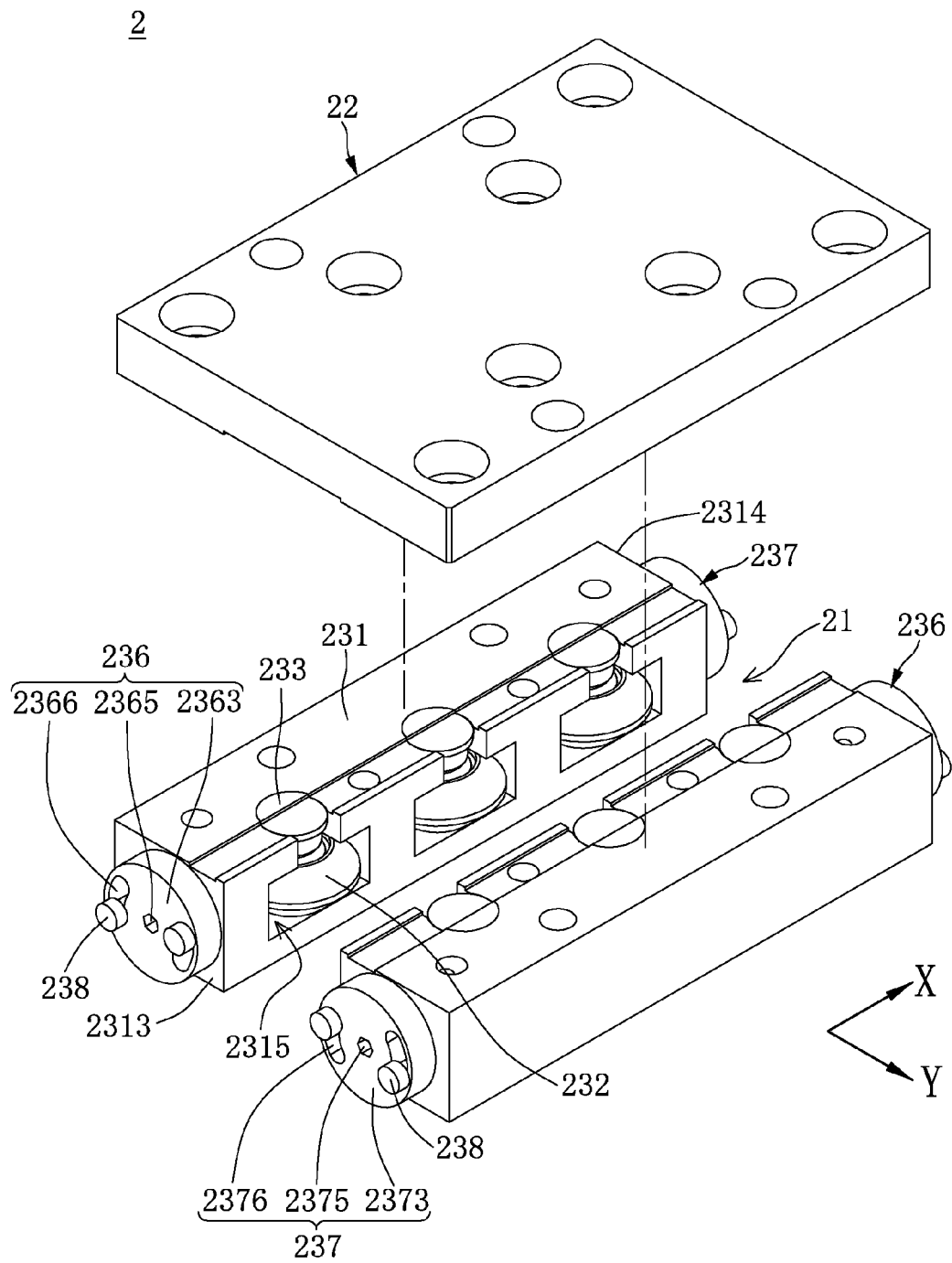
FIG. 3 shows an exploded perspective schematic view of a slider structure of an embodiment in the instant disclosure.
Figure 4:
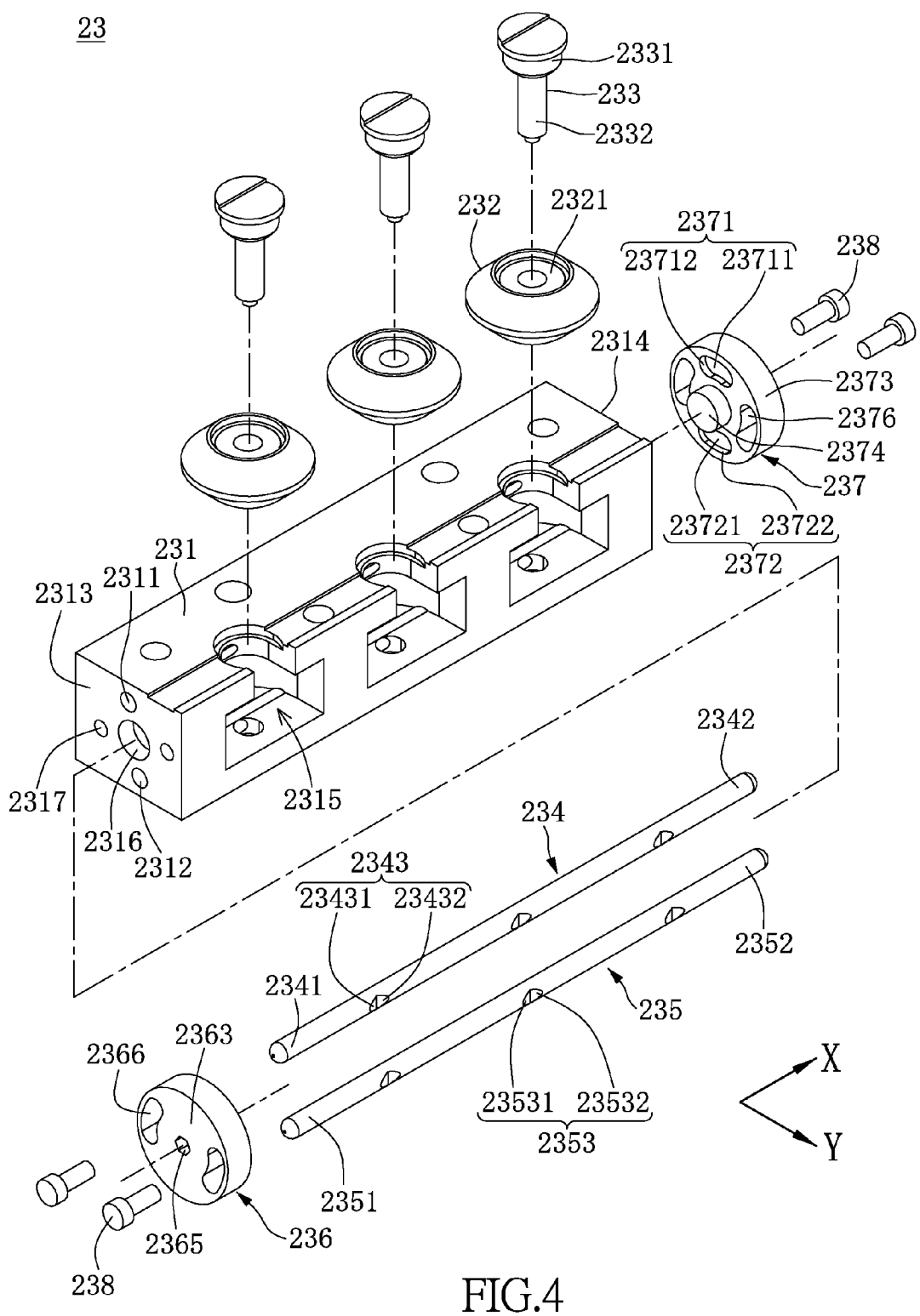
FIG. 4 shows one of the exploded perspective schematic views of a guide wheel seat assembly of an embodiment in the instant disclosure.
Figure 5:
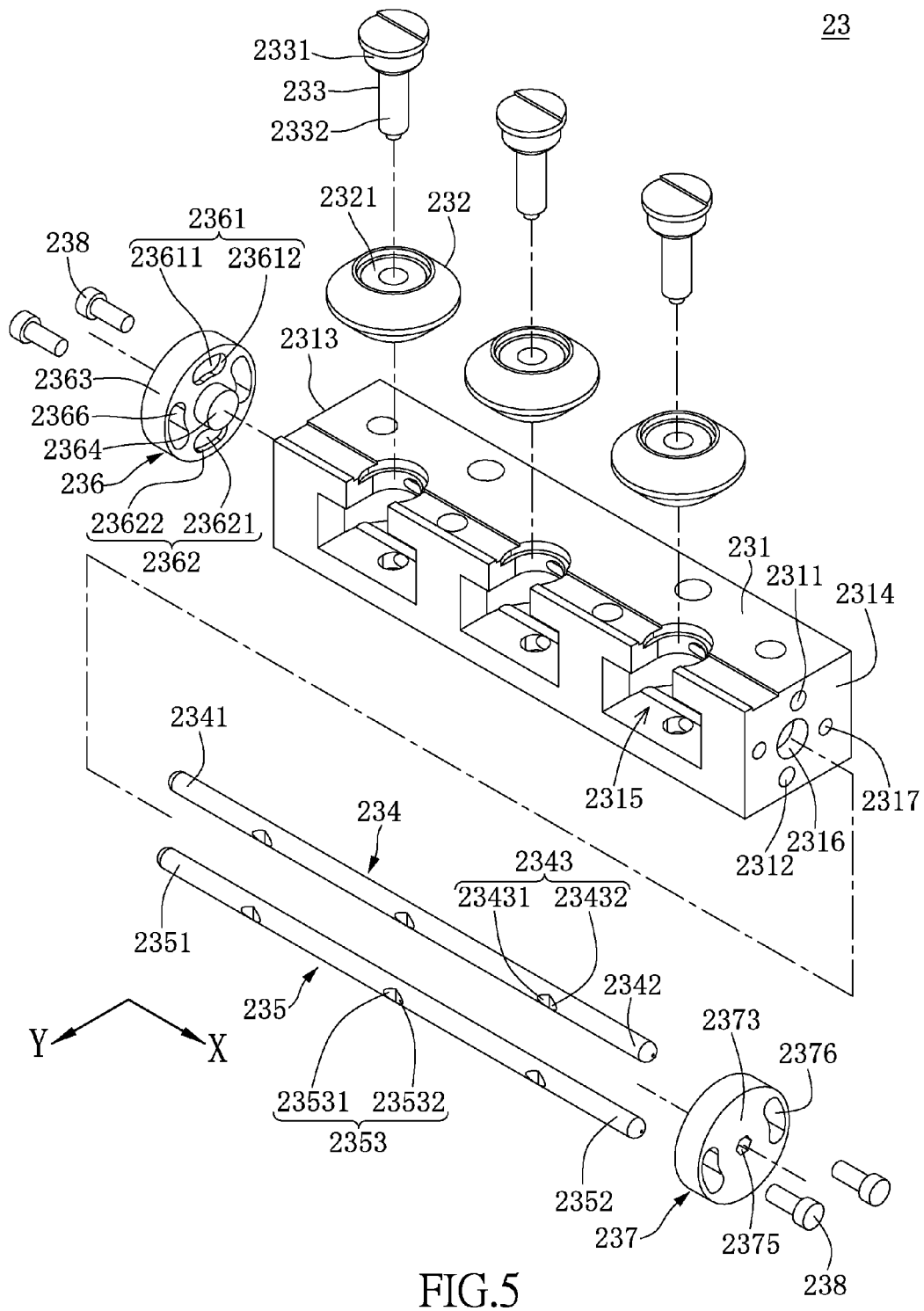
FIG. 5 shows an another exploded perspective schematic view of a guide wheel seat assembly of an embodiment in the instant disclosure.
Figure 6:
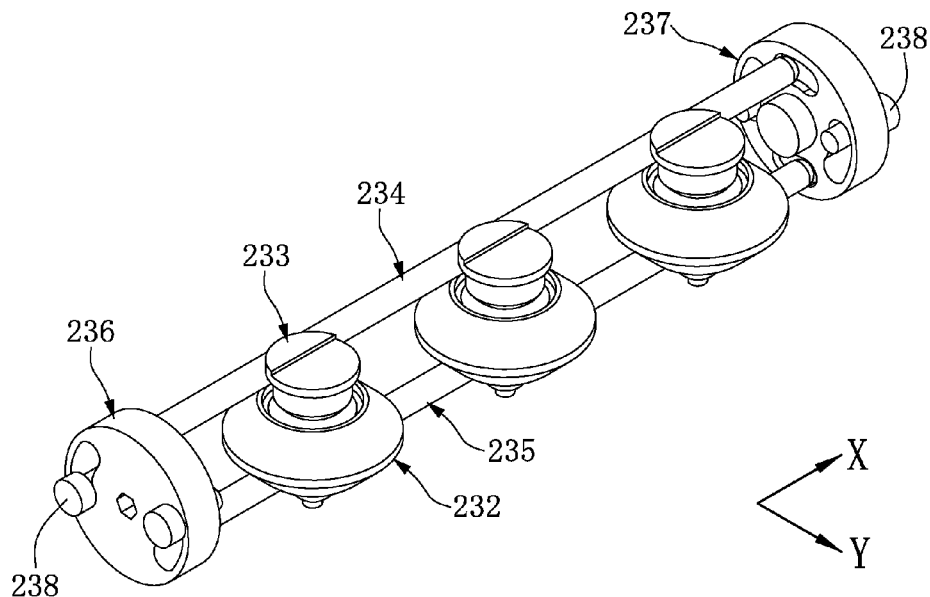
FIG. 6 shows one of perspective views of a guide wheel seat assembly of an embodiment in the instant disclosure.
Figure 7:
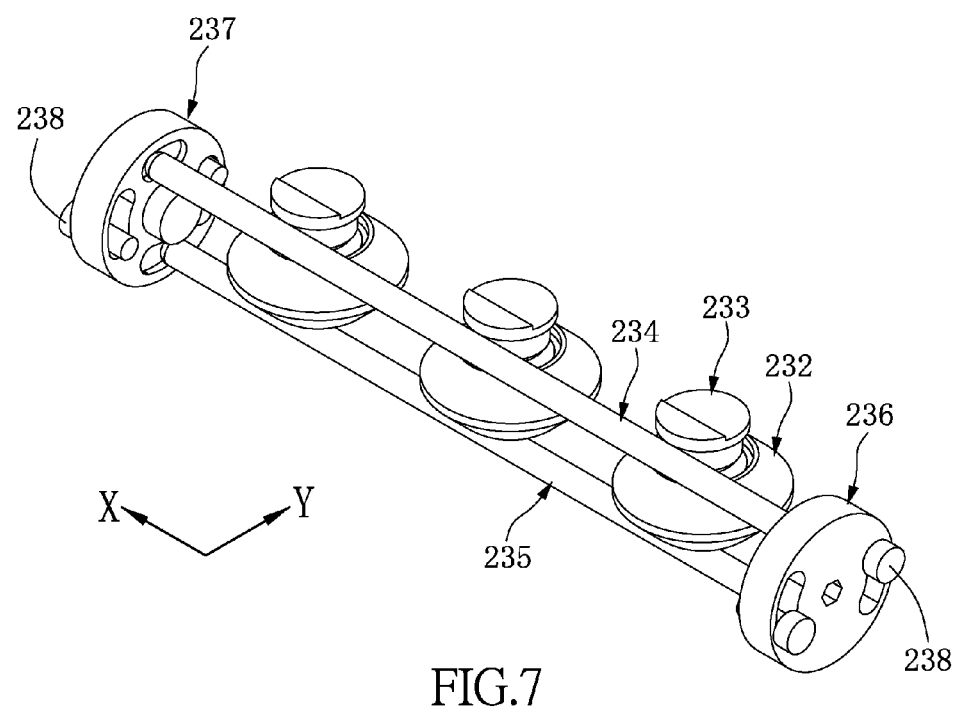
FIG. 7 shows an another perspective view of a guide wheel seat assembly of an embodiment in the instant disclosure.
Figure 8:
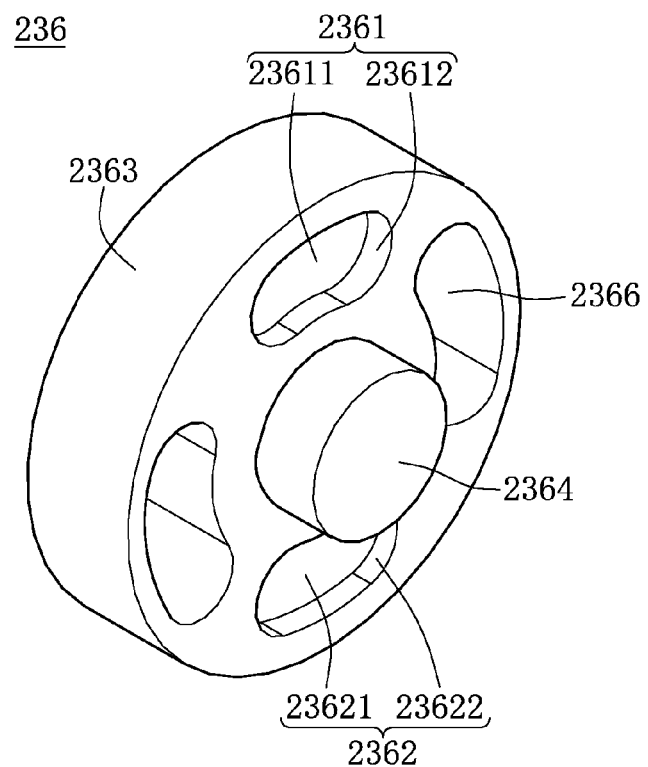
FIG. 8 shows a perspective schematic view of a first adjusting unit of an embodiment in the instant disclosure.
Figure 9:
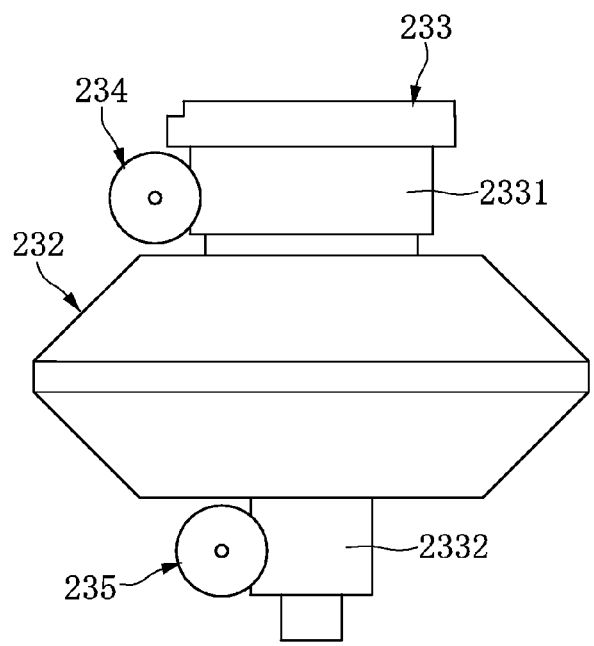
FIG. 9 shows a schematic side view of FIG. 7.

Embodiments of the linear slide rail and guide wheel seat assembly disclosed in the instant disclosure are illustrated via specific examples as follows, and people familiar in the art may easily understand the advantages and efficacies of the instant disclosure by disclosure of the specification. The instant disclosure may be implemented or applied by other different specific examples, and each of the details in the specification may be applied based on different views and may be modified and changed under the existence of the spirit of the instant disclosure. The figures in the instant disclosure are only for brief description, but they are not depicted according to actual size and do not reflect the actual size of the relevant structure. The following embodiments further illustrate related technologies of the instant disclosure in detail, but the scope of the instant disclosure is not limited herein.

Firstly, please refer to FIGS. 1 to 6. A first embodiment of this instant disclosure provides a linear slide rail Z including a rail structure 1 and a slider structure 2. The rail structure 1 has an elongated strip shape and defines a longitudinal axis direction L, the longitudinal axis direction L is a longitudinal direction of the rail structure 1, and the slider structure 2 is reciprocally slidden along the longitudinal axis direction L of the rail structure 1. Additionally, the rail structure 1 has two guide grooves 11 respectively disposed at two opposite sides of the rail structure 1. Specifically, each of the guide grooves 11 includes a first groove body 111 and a second groove body 112, the first groove body 111 and the second groove body 112 are respectively and parallelly recessed at the two opposite sides of the rail structure 1 in a direction of the longitudinal axis direction L, such that a cross-sectional surface across the longitudinal axis direction L perpendicular to the rail structure 1 is substantially an I shape.

The slider structure 2 has a cooperating groove 21 which is slidably sleeved on the rail structure 1. In other words, the cooperating groove 21 is recessed on the slider structure 2, such that a cross-sectional surface across the longitudinal axis direction L perpendicular to the slider structure 2 is substantially an inverted U shape. In addition, the slider structure 2 includes a carrier assembly 22 and two guide wheel seat assemblies 23. The two guide wheel seat assemblies 23 are respectively disposed at two opposite sides of the carrier assembly 22, and the two guide wheel seat assemblies 23 are respectively disposed corresponding to the two guide grooves 11 at the two opposite sides of the rail structure 1, such that the two guide wheel seat assemblies 23 are respectively propped against the first groove body 111 and the second groove body 112 of the rail structure 1. Each of the two guide wheel seat assemblies 23 has as an elongated strip shape and its longitudinal direction is the above mentioned longitudinal axis direction L. The two guide wheel seat assemblies 23 are respectively and symmetrically disposed at the two opposite sides of the rail structure 1. One of the guide wheel seat assemblies 23 is illustrated as follows. Specifically, each of the guide wheel seat assemblies 23 includes a seat unit 231, a plurality of guide wheel units 232, a plurality of shaft units 233, a first lever unit 234, and a first adjusting unit 236. For example, a bearing portion 2321 can be respectively disposed in the plurality of guide wheel units 232, and the plurality of guide wheel units 232 can be slidden or rolled on the first groove body 111 or the second groove body 112. Furthermore, in another embodiment, each of the guide wheel units 232 can be a rolling bearing portion.

According to the above, the seat unit 231 includes a first sliding thru-hole 2311, a first side surface 2313, a second side surface 2314 which is disposed correspondingly to the first side surface 2313, and a plurality of guide wheel grooves 2315. For example, the first side surface 2313 and the second side surface 2314 are respectively disposed at two opposite sides of the seat unit 231, the first sliding thru-hole 2311 can extend and pass through the seat unit 231 along the longitudinal axis direction L, so that the first side surface 2313 and the second side surface 2314 communicate with each other through the first sliding thru-hole 2311, but in this instant disclosure, it is not limited herein. Additionally, the plurality of guide wheel units 232 are respectively disposed in the plurality of guide wheel grooves 2315, and the plurality of shaft units 233 are respectively pivoted to the plurality of guide wheel units 232, so that the plurality of guide wheel units 232 are respectively rotated corresponding to the plurality of shaft units 233, so that the plurality of shaft units 233 and the two guide grooves 11 of the rail structure 1 are rolled or slidden with each other.

Next, the first lever unit 234 is slidably disposed in the first sliding thru-hole 2311, the first lever unit 234 has a plurality of positioning grooves 2343, a first end portion 2341, and a second end portion 2342 disposed correspondingly to the first end portion 2341 of the first lever unit 234, each of the positioning grooves 2343 of the first lever unit 234 has a first propping surface 23431, and the first propping surface 23431 of each of the positioning grooves 2343 of the first lever unit 234 is abutted against each of the plurality of shaft units 233.

According to the abovementioned description, in the embodiment of this instant disclosure, the first adjusting unit 236 is disposed on the first side surface 2313, the first adjusting unit 236 has a first accommodating groove 2361, the first accommodating groove 2361 of the first adjusting unit 236 has a first abutting surface 23611 and a first surrounding surface 23612, and the first surrounding surface 23612 of the first adjusting unit 236 surrounds a periphery of the first abutting surface 23611 of the first adjusting unit 236. In this way, the first end portion 2341 of the first lever unit 234 is disposed in the first accommodating groove 2361 of the first adjusting unit 236, the first end portion 2341 of the first lever unit 234 is slidably abutted against the first abutting surface 23611 of the first adjusting unit 236, and the first end portion 2341 of the first lever unit 234 is reciprocally moved between a first position and a second position of the first abutting surface 23611 of the first adjusting unit 236, so that the first lever unit 234 is reciprocally moved along a first direction X. Each of the shaft units 233 is abutted against the first propping surface 23431 of the first lever unit 234 to reciprocally move along a second direction Y, wherein the first direction X and the second direction Y have different directions, and the second direction Y and the longitudinal axis direction L are perpendicular with each other, but it is not limited in this instant disclosure. For example, the first adjusting unit 236 does not need to be disposed on the first side surface 2313, and does not need to have the first accommodating groove 2361, and only the first abutting surface 23611 may be disposed on the first adjusting unit 236 and abutted against the first lever unit 234 to move the first lever unit 234 along the first direction X. In other words, in the embodiment of this instant disclosure, the first abutting surface 23611 can be an inclined plane or a wedge surface, and the inclined plane or the wedge surface has a height gap which generates a force to push the first lever unit 234 to move in the first direction X.

Preferably, in order to bidirectionally adjust the moving direction of the first lever unit 234, a second adjusting unit 237 is further provided, and the second adjusting unit 237 is disposed on the second side surface 2314 and has a first accommodating groove 2371. The first accommodating groove 2371 of the second adjusting unit 237 has a first abutting surface 23711 and a first surrounding surface 23712, and the first surrounding surface 23712 of the second adjusting unit 237 surrounds a periphery of the first abutting surface 23711 of the second adjusting unit 237. In other words, in the embodiment of this instant disclosure, the first adjusting unit 236 and the second adjusting unit 237 can have an identical structure or shape, but have different disposing positions (respectively located at the two opposite sides of the seat unit 231). In addition, the second end portion 2342 of the first lever unit 234 is disposed in the first accommodating groove 2371 of the second adjusting unit 237, the second end portion 2342 of the first lever unit 234 is slidably abutted against the first abutting surface 23711 of the second adjusting unit 237, and the second end portion 2342 of the first lever unit 234 is reciprocally moved between a first position and a second position of the first abutting surface 23711 of the second adjusting unit 237. In addition, the first abutting surface 23611 of the first adjusting unit 236 and the first abutting surface 23711 of the second adjusting unit 237 are disposed parallel and facing each other.

Furthermore, each of the positioning grooves 2343 of the first lever unit 234 further includes a second propping surface 23432, the first propping surface 23431 and the second propping surface 23432 of the first lever unit 234 are connected with each other to form a notch with V shape, but it is not limited in this instant disclosure. By this way, the first lever unit 234 is reciprocally moved along a positive direction and reverse direction of the first direction X by setting up the first adjusting unit 236 and the second adjusting unit 237, such that each of the shaft units 233 is abutted against the first propping surface 23431 or the second propping surface 23432 to move toward the second direction Y, so as to further drive the plurality of guide wheel units 232 to apply a preload on the rail structure 1.

Please simultaneously refer to FIGS. 6 to 9. In order to equalize the preload applied on the rail structure 1 by the plurality of guide wheel units 232, a second lever unit 235 is further provided to be slidably disposed in a second sliding thru-hole 2312 of the seat unit 231. In more detail, the second lever unit 235 has a plurality of positioning grooves 2353, a first end portion 2351, and a second end portion 2352 disposed correspondingly to the first end portion 2351 of the second lever unit 235. Each of the positioning grooves 2353 of the second lever unit 235 has a first propping surface 23531 and a second propping surface 23532, the first propping surface 23531 or the second propping surface 23532 of the second lever unit 235 is abutted against each of the plurality of the shaft units 233. It is worth to note that the second lever unit 235 and the first lever unit 234 have the same structure, so it does not bear repeating herein.

The first adjusting unit 236 further includes a second accommodating groove 2362 which has a second abutting surface 23621 and a second surrounding surface 23622, and the second surrounding surface 23622 of the first adjusting unit 236 surrounds a periphery of the second abutting surface 23621 of the first adjusting unit 236. In addition, the second adjusting unit 237 further includes a second accommodating groove 2372 which has a second abutting surface 23721 and a second surrounding surface 23722, and the second surrounding surface 23722 of the second adjusting unit 237 surrounds a periphery of the second abutting surface 23721 of the second adjusting unit 237.

According to the above, the first end portion 2351 of the second lever unit 235 is disposed in the second accommodating groove 2362 of the first adjusting unit 236, the first end portion 2351 of the second lever unit 235 is slidably abutted against the second abutting surface 23621 of the first adjusting unit 236, and the first end portion 2351 of the second lever unit 235 is reciprocally moved between a first position and a second position of the second abutting surface 23621 of the first adjusting unit 236, and is slidably abutted against the second abutting surface 23721 of the second adjusting unit 237, so that the second lever unit 235 is reciprocally moved along a first direction X. Each of the plurality of shaft units 233 is abutted against the first propping surface 23531 of the second lever unit 235 to reciprocally move along a second direction Y. The second abutting surface 23621 of the first adjusting unit 236 and the second abutting surface 23721 of the second adjusting unit 237 are disposed parallel and facing each other.

Specifically, in the embodiment of this instant disclosure, the first adjusting unit 236 further has a base body 2363, a protruding portion 2364, an adjusting portion 2365 which is disposed on the base body 2363, and an opening groove 2366 which passes though the base body 2363. The seat unit 231 further includes a fixing groove 2316 and a plurality of locking grooves 2317, and the fixing groove 2316 and the plurality of locking grooves 2317 are respectively recessed on the first side surface 2313 and the second side surface 2314. In addition, the second adjusting unit 237 further has a base body 2373, a protruding portion 2374, an adjusting portion 2375, and an opening groove 2376. The protruding portion 2364 of the first adjusting unit 236 is disposed at the fixing groove 2316 of the first side surface 2313, and the protruding portion 2374 of the second adjusting unit 237 is disposed at the fixing groove 2316 of the second side surface 2314. In this way, the first adjusting unit 236 and the second adjusting unit 237 are rotated along the fixing groove 2316. By turning the first adjusting unit 236 or the second adjusting unit 237, the first lever unit 234 and the second lever unit 235 are abutted against by the first abutting surface (23611, 23711) and the second abutting surface (23621, 23721) disposed on the first adjusting unit 236 or the second adjusting unit 237 to move along the positive direction and reverse direction of the first direction X, so as to drive the plurality of shaft units 233 moving in the second direction Y.

As above, for example, in the embodiment of this instant disclosure, the adjusting portion (2365, 2375) can have a hexagonal recess, a user can rotate it by a hand tool, meanwhile, each of the fixing members 238 is penetratively disposed through the opening groove (2366, 2376) of the first adjusting unit 236 or the second adjusting unit 237, and is fixed in the locking groove 2317 to limit positions of the first lever unit 234 and the second lever unit 235, but it is not limited in this instant disclosure. In other words, the adjusting portion (2365, 2375) also can be disposed outside of the base body (2363, 2373), and the user can adjust it by means of other hand tools.

Figure 10:
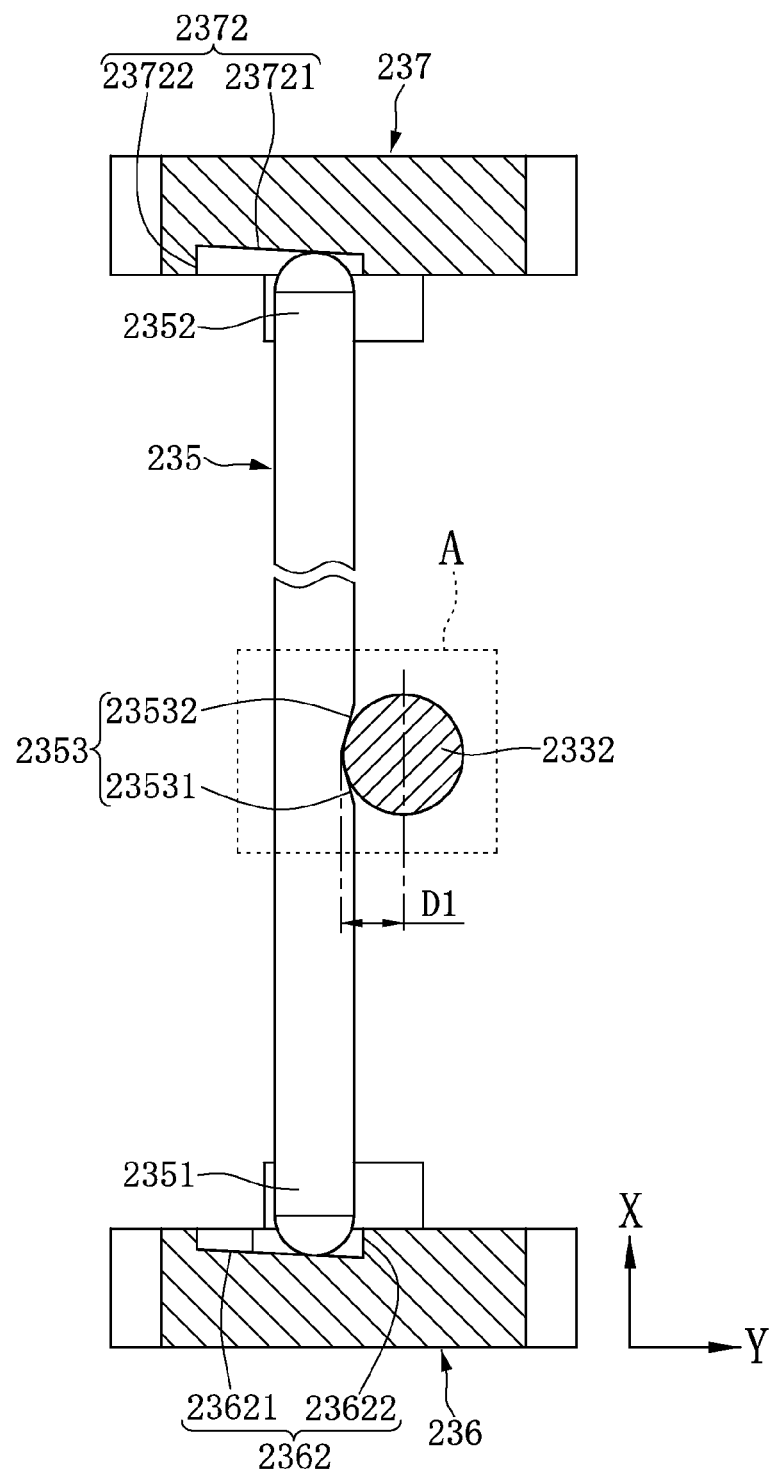
FIG. 10 shows a schematic view of one of the use states of a guide wheel seat assembly of an embodiment in the instant disclosure.
Figure 11:
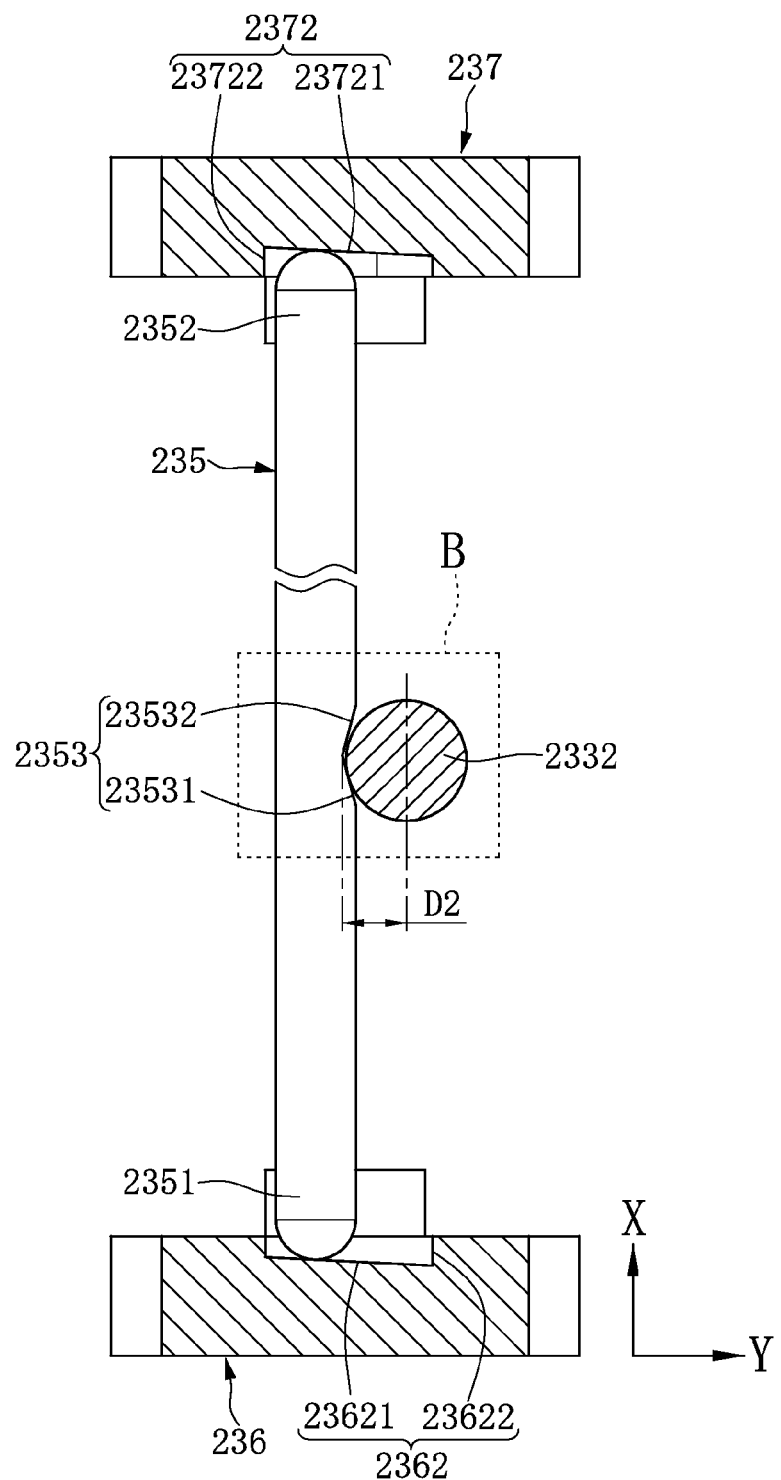
FIG. 11 shows a schematic view of another use state of a guide wheel seat assembly of an embodiment in the instant disclosure.
Figure 12:
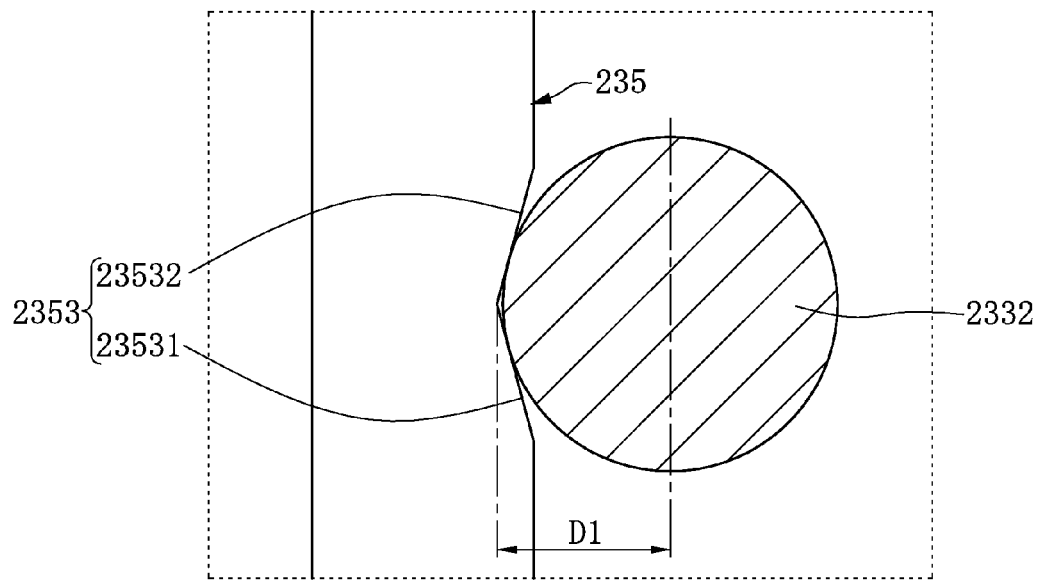
FIG. 12 shows a partial enlarged schematic view of the A part of FIG. 10.
Figure 13:
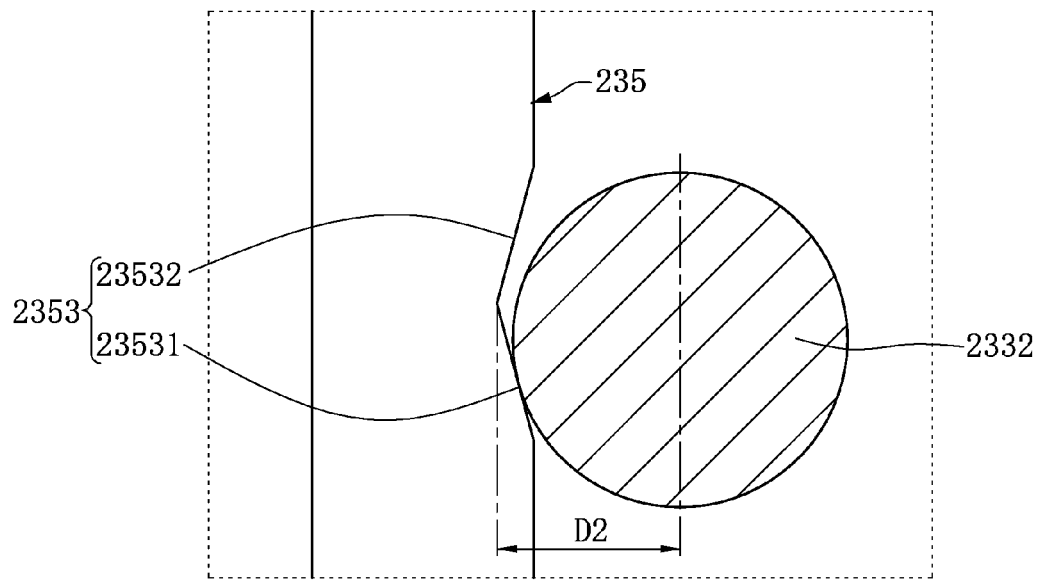
FIG. 13 shows a partial enlarged schematic view of the B part of FIG. 11.
Figure 14:
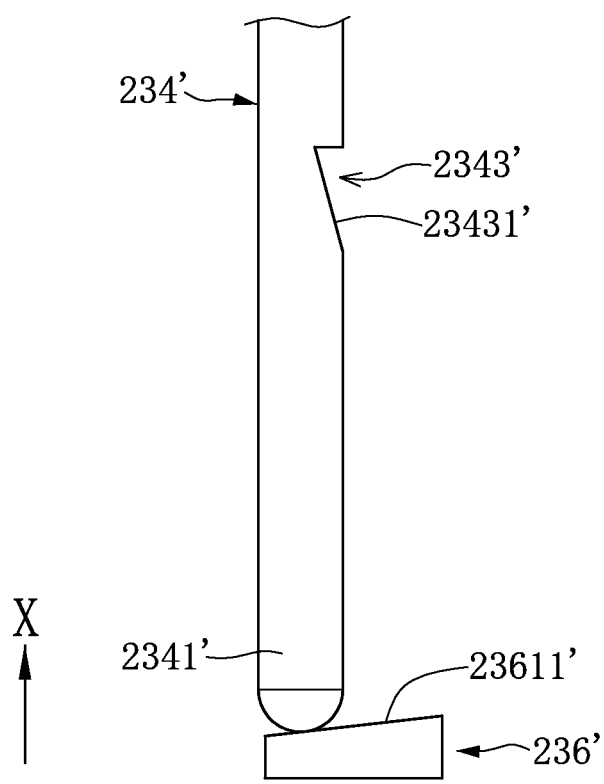
FIG. 14 shows a schematic view of another aspect of a first lever unit of an embodiment in the instant disclosure.

Please refer to FIGS. 10 to 13. FIG. 12 shows a partial enlarged schematic view of the A part of FIG. 10, and FIG. 13 shows a partial enlarged schematic view of the B part of FIG. 11. Firstly, the user can loosen the second adjusting unit 237 and rotate the first adjusting unit 236, and the second abutting surface 23621 of the first adjusting unit 236 applies a pressure on the second lever unit 235, so as to move the second lever unit 235 along the first direction X (longitudinal direction). Thus, the first propping surface 23531 of the second lever unit 235 can be abutted against the shaft unit 233 to move the shaft unit 233 toward the second direction Y (transverse direction), such that the plurality of guide wheel units 232 apply a preload on the rail structure 1. As a result, before the first adjusting unit 236 is rotated, there is a first distance D1 between a center point of the shaft unit 233 and an endpoint of the positioning groove 2353 of the second lever unit 235. After the first adjusting unit 236 is rotated, there is a second distance D2 between a center point of the shaft unit 233 and an endpoint of the positioning groove 2353 of the second lever unit 235. The second distance D2 is larger than the first distance D1. Please refer to FIG. 13. It is worth to note that, the shape of the positioning groove 2343' of the first lever unit 234' and the first adjusting unit 236' can be different from the above Figures, and only one single first adjusting unit 236' can be disposed to abut against the first end portion 2341' by the first abutting surface 23611' of the first adjusting unit 236', but it is not limited in this instant disclosure. In other words, the first end portion 2341' can be abutted against by the inclined plane or the wedge surface of the first adjusting unit 236'.

Efficacy of Embodiments

In summary, the instant disclosure has the advantage that, in the linear slide rail Z and guide wheel seat assembly 23 of the embodiment of this instant disclosure, a displacement of the first lever unit 234 is spurred by the movement of the first adjusting unit 236, such that the plurality of first abutting surfaces 23431 of the first lever unit 234 are abuttedly pivoted to the plurality of shaft units 233 of the plurality of guide wheel units 232 respectively, and the first lever unit 234 is reciprocally moved along a first direction X. During the moving process of the first lever unit 234, a plurality of first propping surfaces 23431 of the first lever unit 234 are abutted against the plurality of shaft units 233 to drive the plurality of guide wheel units 232 moving along a second direction Y, so as to achieve the plurality of guide wheel units 232 applying the preload on the guide groove 11 of the rail structure 1 at the same time to increase a stiffness of the linear slide rail Z, and a pendulum and an inertia impact generated by reciprocation can be decreased.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A guide wheel seat assembly, comprising:
a seat unit including a first sliding thru-hole and a plurality of guide wheel grooves;
a plurality of guide wheel units respectively disposed in the plurality of guide wheel grooves;
a plurality of shaft units respectively pivoted to the plurality of guide wheel units, so that the plurality of guide wheel units are respectively rotated corresponding to the plurality of shaft units;
a first lever unit slidably disposed in the first sliding thru-hole, the first lever unit having a plurality of first propping surfaces, a first end portion, and a second end portion disposed correspondingly to the first end portion of the first lever unit, wherein each of the first propping surfaces of the first lever unit is respectively abutted against each of the shaft units; and
a first adjusting unit having a first abutting surface, the first end portion of the first lever unit is slidably abutted against the first abutting surface of the first adjusting unit, so that the first lever unit is reciprocately moved along a first direction, and each of the shaft units is respectively abutted against each of the first propping surfaces of the first lever unit to reciprocately move along a second direction.

2. A linear slide rail, comprising:
a rail structure having an elongated shape and defining a longitudinal axis direction, wherein the rail structure has two guide grooves respectively disposed at two opposite sides of the rail structure; and
a slider structure having a cooperating groove, the slider structure slidably disposed on the rail structure through the cooperating groove, wherein the slider structure includes:
a carrier assembly; and
two guide wheel seat assemblies are respectively disposed at two opposite sides of the carrier assembly, and the two guide wheel seat assemblies are respectively disposed corresponding to the two guide grooves at the two opposite sides of the rail structure, each of the guide wheel seat assemblies includes a seat unit, a plurality of guide wheel units, a plurality of shaft units, a first lever unit, and a first adjusting unit, wherein the seat unit includes a first sliding thru-hole;
wherein in each of the guide wheel seat assemblies, the plurality of shaft units are respectively pivoted to the plurality of guide wheel units, so that the plurality of guide wheel units are respectively rotated corresponding to the plurality of shaft units, and the plurality of guide wheel units are rolled and slidden along each of the guide grooves;
wherein in each of the guide wheel seat assemblies, the first lever unit is slidably disposed in the first sliding thru-hole, the first lever unit has a plurality of positioning grooves, a first end portion, and a second end portion disposed correspondingly to the first end portion of the first lever unit, each of the positioning grooves of the first lever unit has a first propping surface, and each of the first propping surfaces of the first lever unit is respectively abutted against each of the shaft units;
wherein in each of the guide wheel seat assemblies, the first adjusting unit has a first abutting surface, the first end portion of the first lever unit is slidably abutted against the first abutting surface of the first adjusting unit, so that the first lever unit is reciprocally moved along a first direction, and each of the shaft units is respectively abutted against each of the first propping surfaces of the first lever unit to reciprocally move along a second direction.

3. The linear slide rail as claimed in claim 2, wherein in each of the guide wheel seat assemblies, the seat unit further comprises a plurality of guide wheel grooves, the plurality of guide wheel units are respectively disposed in the plurality of guide wheel grooves.

4. The linear slide rail as claimed in claim 2, wherein in each of the guide wheel seat assemblies, the guide wheel seat assembly further comprises a fixing member, the seat unit further comprises a fixing groove and a locking groove, the first adjusting unit further comprises a base body, a protruding portion connected to the base body, and an opening groove, the opening groove passes through the base body, and the fixing member is penetratively disposed through the opening groove and is fixed in the locking groove.

5. The linear slide rail as claimed in claim 2, wherein in each of the guide wheel seat assemblies, the first adjusting unit further comprises a first accommodating groove, the first end portion of the first lever unit is disposed in the first accommodating groove, and the first propping surface is disposed at a bottom of the first accommodating groove and is surrounded by a first surrounding surface.

6. The linear slide rail as claimed in claim 2, wherein in each of the guide wheel seat assemblies, each of the positioning grooves of the first lever unit further comprises a second propping surface, the first propping surface and the second propping surface of the first lever unit are connected with each other to form a V shape.

7. The linear slide rail as claimed in claim 5, in each of the guide wheel seat assemblies, further comprising a second adjusting unit which is disposed correspondingly to the first adjusting unit, wherein the second adjusting unit has a first abutting surface, the second end portion of the first lever unit is slidably abutted against the first abutting surface of the second adjusting unit, and the first abutting surface of the first adjusting unit and the first abutting surface of the second adjusting unit are disposed parallel and facing each other.

8. The linear slide rail as claimed in claim 7, in each of the guide wheel seat assemblies, further comprising a second lever unit, the seat unit further comprising a second sliding thru-hole, the first adjusting unit further comprising a second abutting surface, the second adjusting unit further comprising a second abutting surface, wherein the second sliding thru-hole and the first sliding thru-hole are disposed corresponding to each other, the second lever unit is slidably disposed in the second sliding thru-hole, the second lever unit has a plurality of positioning grooves, a first end portion, and a second end portion disposed correspondingly to the first end portion of the second lever unit, each of the positioning grooves of the second lever unit has a first propping surface, each of the first propping surfaces of the second lever unit is respectively abutted against each of the shaft units, the first end portion of the second lever unit is slidably abutted against the second abutting surface of the first adjusting unit, and the second end portion of the second lever unit is slidably abutted against the second abutting surface of the second adjusting unit, so that the second lever unit is reciprocally moved along the first direction, each of the shaft units is respectively abutted against each of the first propping surfaces of the second lever unit to reciprocally move along the second direction, and the second abutting surface of the first adjusting unit and the second abutting surface of the second adjusting unit are disposed parallel and facing each other.

9. The linear slide rail as claimed in claim 8, wherein in each of the guide wheel seat assemblies, each of the shaft units has a first diameter portion and a second diameter portion, each of the positioning grooves of the first lever unit is abutted against the first diameter portion of each of the shaft units, each of the positioning grooves of the second lever unit is abutted against the second diameter portion of each of the shaft units, and the first diameter portion having an outer diameter is larger than the second diameter portion having an outer diameter.

10. The linear slide rail as claimed in claim 2, wherein in each of the guide wheel seat assemblies, the second direction and the longitudinal axis direction are perpendicular to each other.

* * * * *